(12) United States Patent
Hori et al.

(10) Patent No.: US 8,197,874 B2
(45) Date of Patent: Jun. 12, 2012

(54) METHOD OF PREPARING BAKED EGG

(75) Inventors: Kazuya Hori, Gunma (JP); Eiji Kawase, Saitama (JP); Yuuki Hiruma, Gunma (JP)

(73) Assignee: Ajinomoto Co., Inc., Tokyo (JP)

( * ) Notice: Subject to any disclaimer, the term of this patent is extended or adjusted under 35 U.S.C. 154(b) by 178 days.

(21) Appl. No.: 12/820,658

(22) Filed: Jun. 22, 2010

(65) Prior Publication Data
US 2010/0330242 A1  Dec. 30, 2010

(30) Foreign Application Priority Data

Jun. 25, 2009 (JP) ................................. 2009-151404
Jun. 18, 2010 (JP) ................................. 2010-138893

(51) Int. Cl.
*A23B 5/00* (2006.01)
(52) U.S. Cl. ........ 426/298; 426/523; 426/568; 426/614; 99/352; 99/424; 99/427; 99/348
(58) Field of Classification Search .................. 426/298, 426/523, 568, 302, 614, 438; 99/348, 352, 99/353, 424, 427
See application file for complete search history.

(56) References Cited

U.S. PATENT DOCUMENTS

| | | | | |
|---|---|---|---|---|
| 2,445,879 A | * | 7/1948 | Hall ............................. | 426/327 |
| 2,999,024 A | * | 9/1961 | Stimpson et al. ............ | 426/614 |
| 3,589,334 A | * | 6/1971 | Athas .......................... | 118/326 |
| 4,524,083 A | * | 6/1985 | Liot ............................ | 426/330.1 |

FOREIGN PATENT DOCUMENTS

| | | | |
|---|---|---|---|
| JP | 5-56768 | | 3/1993 |
| JP | 8-131125 | | 5/1996 |
| JP | 2002-58453 A1 | | 2/2002 |
| JP | 2002-209754 | * | 7/2002 |
| JP | 3475294 B2 | | 9/2003 |
| JP | 2003-299578 A1 | | 10/2003 |

OTHER PUBLICATIONS

JP 2002-209754 Translation.*

* cited by examiner

*Primary Examiner* — Drew Becker
*Assistant Examiner* — Preston Smith
(74) *Attorney, Agent, or Firm* — Kratz, Quintos & Hanson, LLP

(57) ABSTRACT

A method of producing baked egg using a horizontal rotating cylinder-type continuous frying apparatus, which baked egg has a small size and a strong fried flavor, is disclosed. Egg liquid is sprayed onto the inner surface of a heating drum while rotating the heating drum to solidify the egg liquid and then to make the solidified egg liquid detach from the inner surface of the heating drum, which egg liquid is sprayed within an area of the inner surface of the heating drum, which area expands at an angle of 60° to 150° in the direction of rotation of the heating drum from a rotation origin defined as the intersection of a vertical line and the rotation axis of the heating drum, wherein the angle is indicated taking the angle of the direction of the vertical line as 0°. The heating drum has a temperature and a rotation speed such that the egg liquid sprayed onto the inner surface of the heating drum is solidified and then the solidified egg liquid is detached from the inner surface before the heating drum rotates by 360°.

3 Claims, 2 Drawing Sheets

METHOD OF PREPARING BAKED EGG

BACKGROUND OF THE INVENTION

I. Field of the Invention

The present invention relates to a method of preparing small-sized baked egg which may be mixed with Chinese-style fried rice, pilaf or the like, using a horizontal rotating cylinder-type continuous frying apparatus.

II. Description of the Related Art

Small-sized baked egg such as one which may be mixed with Chinese-style fried rice, pilaf or the like is usually prepared by adding beaten egg to a heated frying pan, and frying the beaten egg while mixing the egg with rice and other food materials, thereby making the size of the baked egg small and giving fried flavor.

When such baked egg is prepared industrially in a large scale, it may be produced in batch using a kettle-shaped flying machine (see, for example, Patent Literature 1). To inhibit scorching, it has been proposed to heat the egg with vapor (see, for example, Patent Literatures 2 and 3). Further, a method has been proposed wherein egg liquid is fed to an extruder, the fed egg liquid is stirred in the extruder under heat to solidify, and then the solidified egg is extruded through small holes (see, for example, Patent Literature 4).

PRIOR ART REFERENCES

Patent Literature 1: JP 2003-299578 A
Patent Literature 2: JP 8-131125 A
Patent Literature 3: JP 2002-58453 A
Patent Literature 4: JP 5-56768 A

SUMMARY OF THE INVENTION

However, since the heating area of the frying machine described in Patent Literature 1 is limited, a number of flying machines are needed in order to produce the baked egg in a large scale. Therefore, a large space for installing the machines is necessary, and the initial cost is high accordingly. Further, to obtain baked egg having a strong fried flavor, it is necessary to cook the egg at a high temperature. As a result, scorching is likely to occur, so that industrial continuous production is difficult. On the other hand, by the method described in Patent Literatures 2 and 3, in which heating is carried out with vapor, since the moisture of the vapor is added to the egg, the egg after heating is moistured, which deteriorates the flavor of the obtained egg product.

With the method described in Patent Literature 4, since the egg solidified by heat is extruded with a screw or broken with stirring blades, it is difficult to produce small-sized baked egg such as those admixed with Chinese style fried rice. To produce only small-sized baked egg, since the conditions for stirring and breaking the egg must be precisely controlled, it is very difficult to produce the baked egg stably.

Accordingly, an object of the present invention is to provide a method of producing baked egg, by which small-sized baked egg having a strong fried flavor suited for being added to Chinese style fried rice, pilaf or the like can be continuously produced.

To attain this and other objects, the present invention provides a method of producing baked egg using a horizontal rotating cylinder-type continuous frying apparatus having a heating drum whose rotation axis is arranged horizontally, and a heater which heats the heating drum, the method comprising the step of spraying egg liquid onto inner surface of the heating drum while rotating the heating drum and heating the heating drum by the heater to solidify the egg liquid and then to make the solidified egg liquid detach from the inner surface of the heating drum, the egg liquid being sprayed within an area of the inner surface of the heating drum, which area expands at an angle of 60° to 150° shifted in the direction of rotation from a rotation origin defined as the intersection of a vertical line and the rotation axis of the heating drum, the angle being indicated taking the angle of the direction of the vertical line as 0°, the heating drum having a temperature and a rotation speed such that the egg liquid sprayed onto the inner surface of the heating drum is solidified and then the solidified egg liquid is detached from the inner surface before the heating drum rotates by 360°.

Further, the present invention provides a method according to the above-described method of the present invention, wherein the inner surface of the heating drum is provided with a frying oil before spraying the egg liquid. The present invention further provides a method according to the above-described method of the present invention, wherein the egg liquid is a mixture of beaten whole egg and an edible oil(s), the beaten whole egg having a content of 80 to 95% by weight based on the weight of the entire egg liquid.

By the method of producing baked egg according to the present invention, small-sized baked egg having a strong fried flavor can be produced efficiently in a large scale by spraying the egg liquid onto a specific area in the inner surface of the heating drum while rotating the heating drum at a prescribed rotation speed and while heating the heating drum at a prescribed temperature.

BEST MODE FOR CARRYING THE INVENTION

Figure 1:
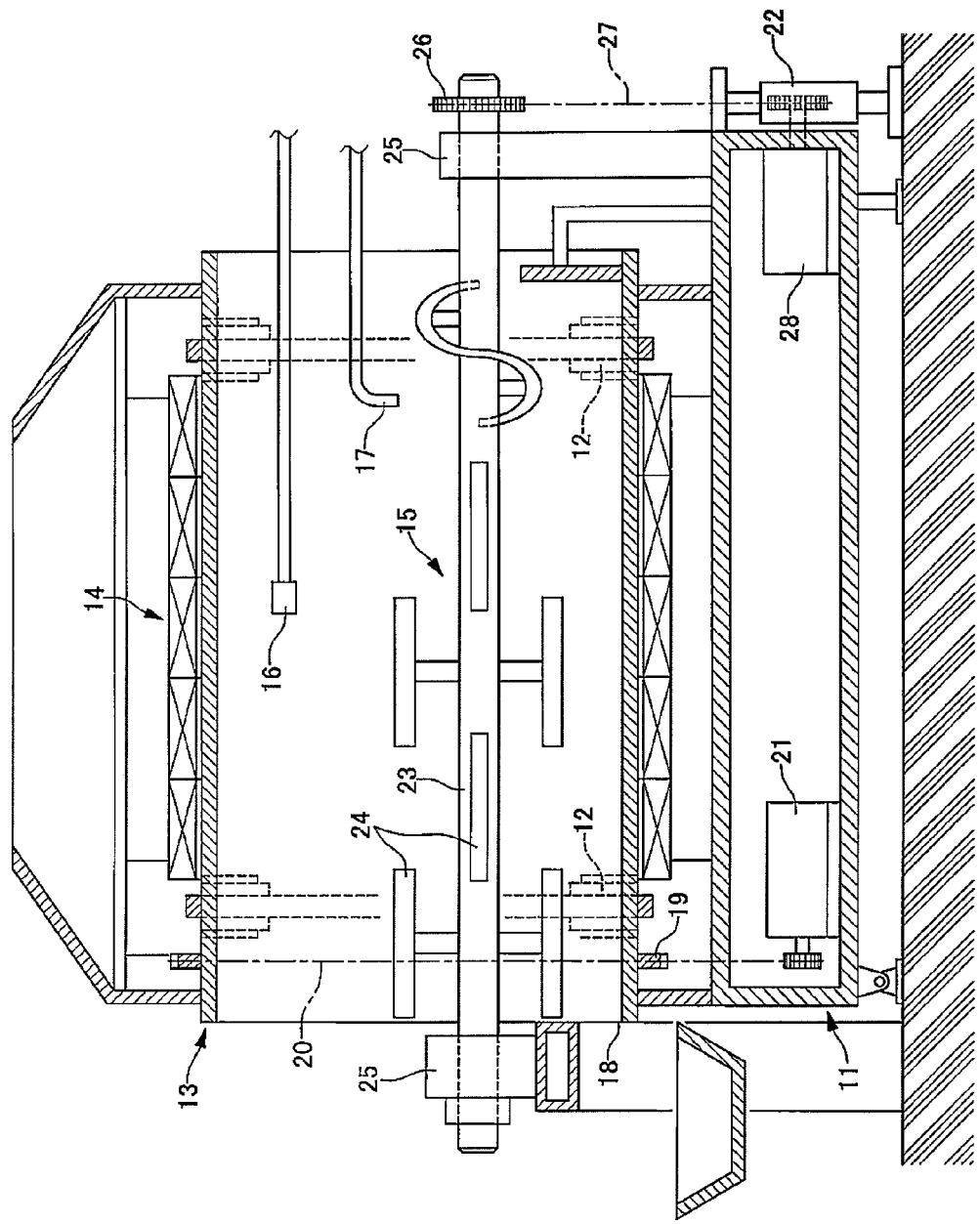
FIG. 1 is a cross-sectional view showing an embodiment of the horizontal rotating cylinder-type continuous flying apparatus which may be used for carrying out the method of preparing baked egg according to the present invention.

In the method of the present invention, as the horizontal rotating cylinder-type continuous frying apparatus used for the production of the baked egg, a frying apparatus having a basic structure described in, for example, JP 3475294 B, which is modified for the production of baked egg as described below can be employed. An embodiment of this type of the horizontal rotating cylinder-type continuous frying apparatus comprises a heating drum 13 in the form of a cylinder rotatably mounted on a plurality of rollers 12 mounted on a frame 11 such that the rotation axis thereof is arranged horizontally; a heater 14 for heating the drum, which is provided in the vicinity of the periphery of the heating drum; and a stirring blade 15 provided in the heating drum 13.

In the inner side of the heating drum 13, an egg liquid nozzle 16 which sprays the egg liquid used as the material of the baked egg, and an oil nozzle 17 for supplying an frying oil are provided, and a product collecting part 18 from which the baked egg product is taken out is provided at one end of the heating drum. A sprocket section 19 is provided on the outer periphery of the heating drum 13, and a drum-driving motor 21 is connected with the sprocket section 19 through a chain 20. In addition, the frame 11 is provided with a jack 22 for adjusting the inclination angle of the heating drum 13.

The heater 14 for heating the drum may be a heat source such as an electric heater or gas heater, which is arranged along the outer periphery of the drum. Alternatively, the heater 14 may be in the form of a coil for heating the heating drum 13 by electromagnetic induction. The heater 14 is divided into a plurality of sections along the rotation axis of the heating drum 13, and the output power of each of the sections of the heater, that is, the amount of heat given by each of the sections to the heating drum 13 can be controlled.

The stirring blade 15 is composed of a rotation shaft 23 arranged in parallel with the central axis of the heating drum 13, and a plurality of blade members 24 projected from the rotating shaft 23 in the radial direction. The both ends of the rotating shaft 23 projected from the both ends of the heating drum 13, respectively, are rotatably mounted on bearings 25, and a sprocket 26 provided on one end of each bearing 25 is connected to a stirring blade-driving motor 28 through a chain 27. The stirring blade 15 as a whole is arranged as a position shifted from the lower end of the heating drum 13 in the direction of rotation of the heating drum 13.

Figure 2:
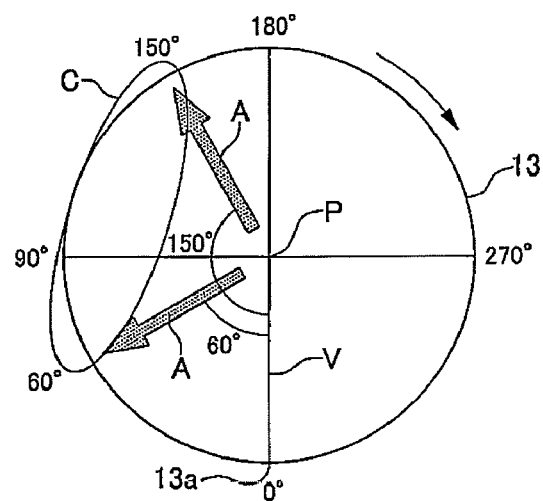
FIG. 2 is a view for explaining the range of the area onto which the egg liquid is to be sprayed.
Figure 3:
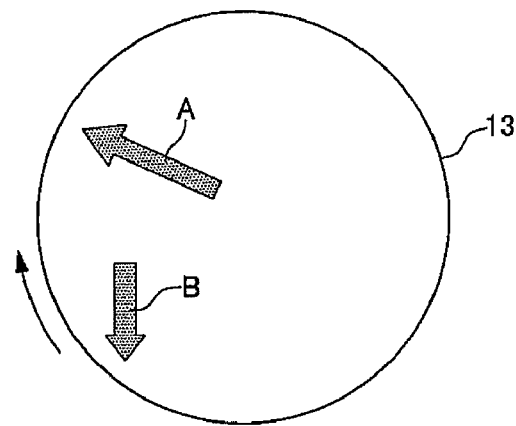
FIG. 3 is a view for explaining the area onto which the egg liquid is to be sprayed and the position of feeding the frying oil.
Figure 4:
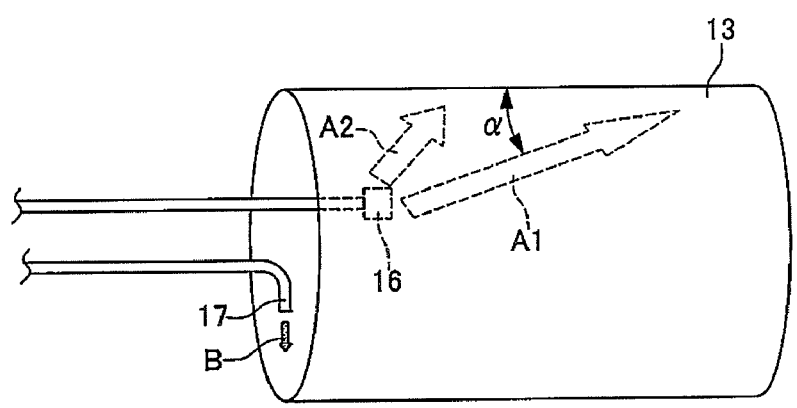
FIG. 4 is a view for explaining the states of an egg liquid nozzle and an oil nozzle.

In producing small-sized baked egg having a strong fried flavor using such a horizontal rotating cylinder-type continuous frying apparatus, the heating drum 13 and the stirring blade 15 are rotated at prescribed rotation speeds in the directions shown by arrows (see FIGS. 1 to 3). Simultaneously, the heating drum 13 is heated at a prescribed temperature by the heater 14. Under this state, as shown in FIGS. 2 to 4, egg liquid A used as the material is sprayed from the egg liquid nozzle 16 and frying oil B is supplied from the oil nozzle 17.

The position onto which the egg liquid A is to be sprayed from the egg liquid nozzle 16 varies depending on various conditions including the diameter, length, rotation speed and temperature of the heating drum 13, state of egg liquid, amount of sprayed egg liquid, spraying pressure, spraying pattern from the egg liquid nozzle 16, spraying angle, distance from the inner surface of the drum and the like. Usually, as shown in FIG. 2, the egg liquid is sprayed within an area C of the inner surface of the heating drum, which area C expands at an angle of 60° to 150° in the direction of rotation from a rotation origin 13a)(0°) defined as the intersection of a vertical line (V) and the rotation axis (P) of the heating drum 13. As shown in FIG. 2, the angle is indicated taking the angle of the direction of said vertical line as 0°.

By spraying the egg liquid A onto the above-described area C, the egg liquid in the form of small droplets sprayed onto the inner surface of the drum heated to a prescribed temperature is heated and the surface of the egg liquid is solidified in a short time. When the thus baked egg reaches the upper portion of the heating drum 13 by the rotation thereof, the baked egg drops to the lower portion of the heating drum 13 due to gravity, and further fried under stirring by the actions of the rotating heating drum 13 and the stirring blade 15. The baked egg then proceeds to the product collecting part 18 due to the inclination of the heating drum 13 and by the action of the stirring blade 15, and removed from the product collecting part 18 as a baked egg product.

In cases where the angle of the position onto which the egg liquid is to be sprayed is less than 60°, the fresh egg liquid may be sprayed onto the baked egg which was previously sprayed and fried. As a result, the size of the resulting baked egg may be large, which is inappropriate as the baked egg to be added to Chinese style fried rice, pilaf or the like. On the other hand, in cases where the angle of the position onto which the egg liquid is to be sprayed is more than 150°, the baked egg solidified by heat may not drop to the lower portion of the heating drum, and the solidified baked egg in the form of a sheet may be adhered to the inner surface of the heating drum 13.

Although the spraying direction of the egg liquid from the egg liquid nozzle 16 may be in the radial direction of the rotating heating drum 13 (i.e., at 90° with respect to the inner surface of the drum), the egg liquid may be sprayed to the side of the product collecting part 18, as shown by arrows A1 and A2 in FIG. 4. Although the angle $\alpha$ with respect to the inner surface of the heating drum 13 varies depending on the above-described various conditions, when the angle $\alpha$ is less than 30°, it may be difficult to spray the egg liquid onto the inner surface of the drum and the sprayed egg liquid may flow along the periphery of the inner surface of the heating drum 13 so that it may be baked into the form of a string. Therefore, the angle $\alpha$ is preferably within the range from 30 to 90°, more preferably 45 to 60°. By setting the angle $\alpha$ within this range, the sprayed egg liquid does not flow on the inner surface of the heating drum 13 and dropping of the baked egg from the upper portion of the heating drum 13 onto the egg liquid nozzle 16 can be prevented.

As the egg liquid used as the material, although commercially available egg liquids usually used may be employed, it is preferred to use a mixture of beaten whole egg and an edible oil(s), which beaten whole egg has a content of 80 to 95% by weight based on the weight of the entire egg liquid. By adding an appropriate amount of an edible oil(s), the detachment of the baked egg from the inner surface of the heating drum 13 is more easily attained, and the flavor of the baked egg product is improved.

The amount of the egg liquid to be sprayed is selected such that the sprayed egg liquid is uniformly attached to the inner surface of the heating drum 13 and a large amount of the egg liquid does not drop or flown down. That is, by selecting the amount of the egg liquid to be sprayed depending on the conditions including the temperature of the position to be supplied with the frying oil and the temperature of the position to be sprayed with the egg liquid, rotation speed of the heating drum 13, and the state of spraying and spraying pressure from the egg liquid nozzle 16, the desired baked egg can be efficiently obtained. For example, by increasing the spraying pressure, the droplets of the sprayed egg liquid can be made smaller, and baked egg having a smaller size can be obtained.

The time of frying may be controlled by appropriately selecting the conditions including length, inclination and rotation speed of the heating drum 13, shape and arrangement of the blade members 24 of the stirring blade 15 and rotation speed of the stirring blade 15. The temperature and the rotation speed of the heating drum 13 is selected such that the surface of the egg liquid sprayed onto the above-described area C at an angle of 60 to 150° in the inner surface of the heating drum 13 is sufficiently solidified by heat and the solidified egg is detached from the inner surface of the heating drum 13 by dropping onto the lower portion of the heating drum 13 by gravity or by slipping down along the inner surface of the heating drum 13 during the heating drum 13 rotates by 360°, that is, during one turn of the heating drum 13. By this, it is prevented that the fresh egg liquid is sprayed onto the baked egg attached to the inner surface of the heating drum 13, so that it is prevented that semi-solidified egg liquid aggregates and grows to a larger block. As a result, comparatively small-sized baked egg can surely be produced.

The frying oil B is supplied from the oil nozzle 17 before spraying the egg liquid from the egg liquid nozzle 16, to a position which is well heated when the egg liquid is sprayed.

The method of supplying frying oil B may be appropriately selected depending on the conditions such as the amount of the frying oil B to be supplied and the rotation speed of the heating drum 13. The frying oil B may be sprayed or jetted to the inner surface of the heating drum 13, or may be merely made to flow down or drop onto the lower portion of the heating drum 13.

In cases where the stirring blade 15 is arranged in the inner side of the heating drum 13 such that it rotates independently from the heating drum 13, by appropriately selecting the position and rotation speed of the stirring blade 15, and the shape of the blade members 24, the baked egg dropped to the lower portion of the heating drum 13 can be fried while breaking the baked egg. As a result, scorching of the baked egg can be prevented and the flavor of the baked egg can be improved, as well as the growth of the baked egg to large blocks can be prevented.

By producing the baked egg as describe above, only small-sized baked egg having a strong fried flavor can be produced in a large amount. By adding the thus obtained baked egg to frozen rice foods such as Chinese style fried rice, pilaf, rice fried with chicken and dry curry rice, the quality of such frozen rice foods can be improved. In addition, the baked egg may be added to other various frozen foods as a material, or may be used as a topping. Further, since the baked egg alone can be stored in frozen state, an optional amount thereof may be used in domestic homes as a material of topping or additive in cooking. Since the baked egg has sufficient fried flavor, it is best suited as a material for enhancing fried flavor of Chinese foods, or as a topping or additive material for fried foods.

It should be noted that the horizontal rotating cylinder-type continuous frying apparatus is not limited to the embodiment described above, and horizontal rotating cylinder-type continuous frying apparatuses having various constitutions can be used. For example, the apparatus may be one which does not have an independently rotatable stirring blade, or the stirring blade may be in the form of projections formed on the inner surface of the heating drum at appropriate positions.

Example 1

Baked egg was produced using a horizontal rotating cylinder-type continuous frying apparatus having a heating drum with a diameter of 310 mm. The rotation speed of the heating drum was 19 rpm, the temperature of the heating drum was 180° C. to 240° C., and the amount of the supplied egg liquid was 150 to 600 g per minute. As the egg liquid, a mixture containing 82% by weight of beaten whole egg and 10% by weight of palm oil, mixed by stirring, was used. As the frying oil, palm oil, 8% by weight was supplied at a rate of 25 g per minute. By adjusting the temperature of the heating drum, the angle of rotation of the drum at which the egg liquid sprayed onto the inner surface of the drum is detached and the angle of rotation of the drum at which the egg is solidified were adjusted as shown in Table 1, and the position onto which the egg liquid was sprayed was selected as shown in Table 1.

The flavor and shape of the produced baked egg as well as the ease of detachment of the baked egg from the drum were evaluated into 3 ranks. The results are shown in Table 1 below.

TABLE 1

| Angle of drum rotation when baked egg was detached | Angle of drum rotation when egg was solidified | | Position sprayed with liquid egg | | |
|---|---|---|---|---|---|
| | | | 60-150° | 0-60° | 180-240° |
| Not less than 360° | Not less than 360° | fried flavor and shape | X | X | X |
| | | ease of detachment from drum | X | X | X |
| | | overall evaluation | X | X | X |
| Less than 360° | Less than 360° | fried flavor and shape | ○ | Δ | Δ |
| | | ease of detachment from drum | ○ | ○ | ○ |
| | | overall evaluation | ○ | Δ | Δ |
| Not less than 360° | Less than 360° | fried flavor and shape | Δ | X | Δ |
| | | ease of detachment from drum | Δ | Δ | Δ |
| | | overall evaluation | Δ | X | Δ |

○: good
Δ: moderate
X: poor

What is claimed is:

1. A method of producing baked egg using a horizontal rotating cylinder-type continuous frying apparatus having a heating drum whose rotation axis is arranged horizontally, and a heater which heats said heating drum, said method comprising the step of spraying egg liquid onto inner surface of said heating drum while rotating said heating drum and heating the heating drum by the heater to solidify said egg liquid and then to make the solidified egg liquid detach from said inner surface of said heating drum, said egg liquid being sprayed within an area of said inner surface of said heating drum, which area expands at an angle of 60° to 150° shifted in the direction of rotation from a rotation origin defined as the intersection of a vertical line and said rotation axis of said heating drum, said angle being indicated taking the angle of the direction of said vertical line as 0°, said heating drum having a temperature and a rotation speed such that said egg liquid sprayed onto said inner surface of said heating drum is solidified and then the solidified egg liquid is detached from said inner surface before said heating drum rotates by 360°.

2. The method according to claim 1, wherein said inner surface of said heating drum is provided with a frying oil before spraying said egg liquid.

3. The method according to claim 1, wherein said egg liquid is a mixture of beaten whole egg and an edible oil(s), said beaten whole egg having a content of 80 to 95% by weight based on the weight of the entire egg liquid.

* * * * *